Feb. 3, 1925.
C. F. WASSERFALLEN
1,524,896
TIRE CARRIER FOR DISK WHEELS
Filed Nov. 19, 1923
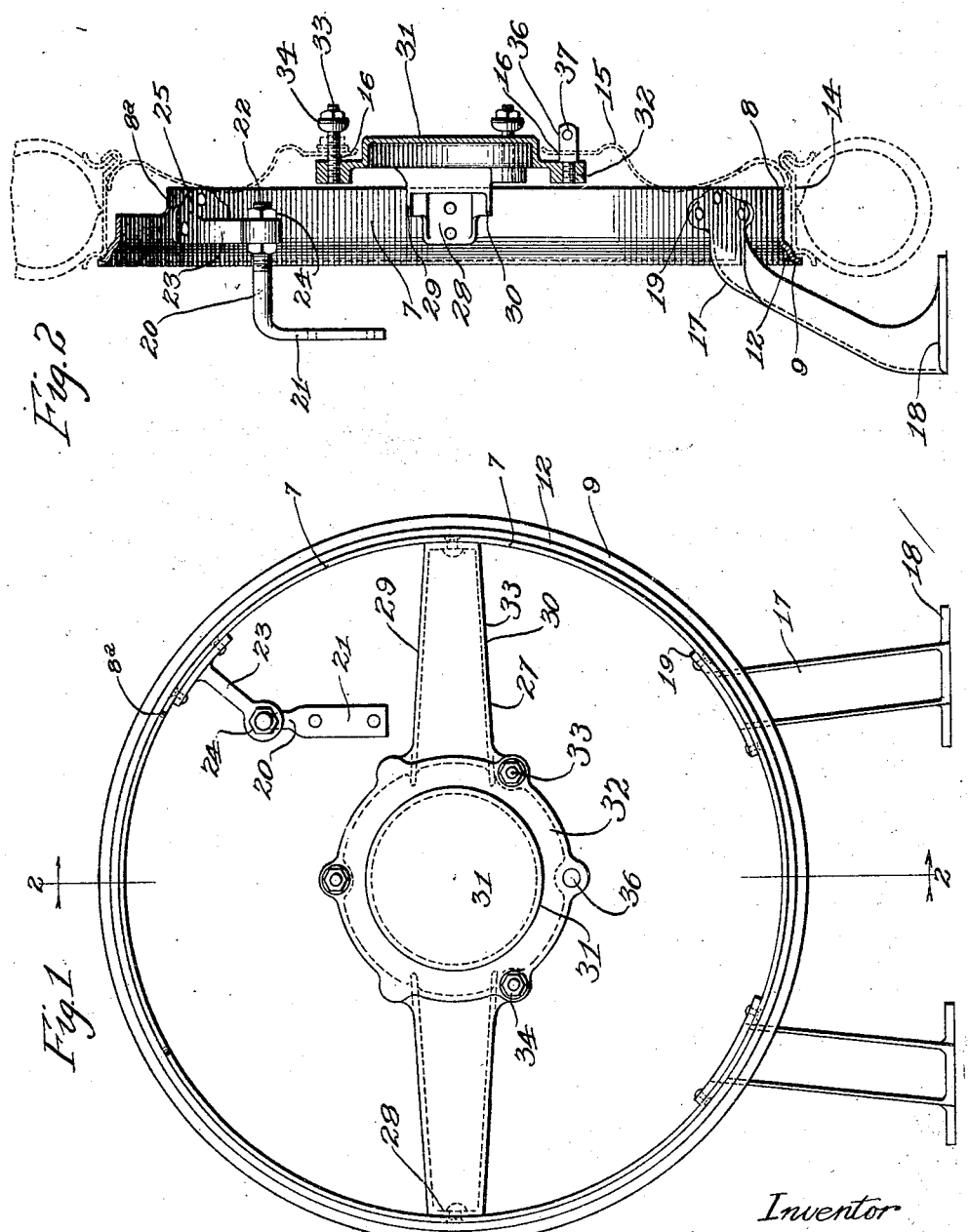
Inventor
Charles F. Wasserfallen
by Fred Gerlach
his Atty.

Patented Feb. 3, 1925.

1,524,896

UNITED STATES PATENT OFFICE.

CHARLES F. WASSERFALLEN, OF DETROIT, MICHIGAN, ASSIGNOR TO DETROIT CARRIER & MANUFACTURING CO., OF DETROIT, MICHIGAN, A CORPORATION OF DELAWARE.

TIRE CARRIER FOR DISK WHEELS.

Application filed November 19, 1923. Serial No. 675,472.

*To all whom it may concern:*

Be it known that I, CHARLES F. WASSERFALLEN, a citizen of the United States, and a resident of Detroit, in the county of Wayne and State of Michigan, have invented certain new and useful Improvements in Tire Carrier for Disk Wheels, of which the following is a full, clear, and exact description.

The invention relates to carriers for spare wheels of motor vehicles and more particularly to that type which is adapted to securely support disk-wheels which are demountable at the hub.

One object of the invention is to provide an improved carrier for spare disk wheels in which provision is made for supporting the wheel at the rim and to more efficiently secure the rim than is possible when it is supported entirely at the hub. Other objects of the invention will appear from the detailed description.

The invention consists in the several novel features hereinafter set forth and more particularly defined by claims at the conclusion hereof.

In the drawings: Fig. 1 is a side elevation of a carrier embodying the invention. Fig. 2 is a section taken on line 2—2 of Fig. 1.

The invention is exemplified in a carrier which comprises an annular band or ring 7. This ring is provided with a base and an outwardly extending flange 9 at the inner side thereof, on which is formed a seat 12 for one side of the tire rim 14 of a demountable wheel. The carrier of the present invention is more particularly adapted for securing demountable wheels of the disk type exemplified by that shown in Fig. 2 and comprising a tire-rim 14 which may be of usual construction and a rear disk 15 forming the body of the wheel and provided with holes 16 for bolts whereby the inner portion of the disk may be demountably secured or bolted to the hub on a wheel axle and also with a central opening for the hub. A portion of the base 8 of the supporting ring 7 is cut away, as at 8ª for the usual valve-stem or nipple which projects inwardly from the tire-rim 14. The rim 14 may be supported from the vehicle in suitable manner. The carrier is illustrated as adapted to be mounted on the running board of a vehicle, and for this purpose brackets 17 are provided with base-flanges 18 which are adapted to be bolted to the running board and with lugs 19 extended to lap and riveted to the inner periphery of the base 8 of ring 7. The upper portion of the ring may be supported by an angle-bracket 20 which has a downwardly extending member 21 which is adapted to fit against a suitable portion of the vehicle-body and an outwardly extending screw-threaded member 22. Member 22 extends through lugs 23 which are clamped to the bracket 20 by nuts 24 on member 22. This bracket may be secured upon the ring, so that it will conform to any position of the body of the vehicle, which is desired. Lugs 23 are provided at their outer ends with flanges 25 which are riveted against the inner periphery of the base flange 8 of ring 7. This bracket exemplifies means for supporting the ring or band on which the disk-wheel is seated.

A bar 27 extends diametrically across the supporting ring and is provided with end lugs or flanges 28 which are riveted to the inner periphery of base 8 of the supporting ring. This bar is provided with upper and lower ribs 29 and 30 to reinforce it transversely and is formed with an integral hub or boss 31 which projects outwardly from the face of the bar and is adapted to extend through the hub opening in the disk 15. The cross-bar 27 is also formed with an integral outwardly extending flange 32, in which are secured a series of bolts 33 which are adapted to pass through the usual openings 16 in the disk 15 for the bolts or studs by which the disk is attached to the hub on an axle. Nuts 34, threaded to bolts 33 respectively, are adapted to engage the outer face of disk 15 to secure the wheel to force it into position so that the tire rim 14 will be securely held on the seat 12 on the ring 7 in such manner that squeaks and rattles will be effectively avoided. If desired, one of the screw-bolts 33 may be omitted and a pin 36 secured in its place, the pin being provided with a hole 37 for a padlock by which the wheel may be secured against theft from the carrier.

To secure the demountable disk-wheel on the carrier, it is only necessary to position the wheel so that the tire rim 14 will extend around the supporting ring 7 and so that the hub 31 of cross-bar 27 will pass through the hub opening in the disk 15, the bolts 33 being in registry with and passing through the usual bolt-holes in the disk. When the nuts 34 are tightened, they will exert a clamping pressure against the disk so that the tire rim 14 will be firmly pressed into contact with and secured on the annular seat 12 on ring 7. To remove the wheel, it is only necessary to loosen the nuts 34 and slip it off the carrier.

The flange forming the seat 12 is usually tapered and the base of the tire rim is usually curved, and as a result of forcing the tire rim on the tapered annular seat on the ring, the demountable wheel will be effectively supported at its rim so that squeaks and rattles will be avoided.

The invention exemplifies a carrier for spare disk wheels, in which a ring with an annular seat thereon constitutes the essential supporting element and in which provision is made for clamping the tire-rim on the ring by means supported from the ring.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A carrier for disk-wheels comprising in combination a ring provided with a seat for a tire rim on the wheel, means for supporting the ring from a vehicle, and clamping means to pass through the usual bolt holes in the disk of the rim, for securing the wheel on the ring.

2. A carrier for disk-wheels comprising in combination a ring provided with a circumferential seat for a tire rim on the wheel, means for supporting the ring from a vehicle, and clamping means to pass through the usual bolt holes in the disk of the rim, for securing the wheel on the ring.

3. A carrier for disk wheels comprising in combination a ring provided with a seat for a tire rim on the wheel, means for supporting the ring from a vehicle, and clamping means supported from the ring to pass through the usual bolt holes in the disk of the rim, for securing the wheel on the ring.

4. A carrier for disk wheels comprising in combination a ring provided with a circumferential seat for a tire rim on the wheel, means for supporting the ring from a vehicle, and clamping means supported from the ring to pass through the usual bolt holes in the disk of the rim, for securing the wheel on the ring.

5. A carrier for disk wheels comprising in combination a ring provided with a seat for a tire rim on the wheel, means for supporting the ring from a vehicle, a hub secured to the ring and clamping means for the disk of the rim to secure the wheel on the ring.

6. A carrier for disk wheels comprising in combination a ring provided with a circumferential seat for a tire rim on the wheel, means for supporting the ring from a vehicle, a hub secured to the ring and clamping means for the disk of the rim to secure the wheel on the ring.

7. In a tire carrier for disk wheels, the combination of a ring provided with a seat for the tire rim of the wheel, means for securing the ring to a vehicle, a cross-bar fixed to the ring and clamping means supported on said cross-bar to secure the wheel on the ring.

8. In a tire carrier for disk wheels, the combination of a ring provided with a flange having an annular seat for the tire rim of the wheel, means for securing the ring to a vehicle, a cross-bar fixed to the ring and clamping means supported on said cross-bar to secure the wheel on the ring.

9. In a tire carrier for disk wheels, the combination of a ring provided with a seat for the tire rim of the wheel, means for securing the ring to a vehicle, a cross-bar fixed to the ring and clamping means supported on said cross bar comprising bolts adapted to extend through the disk of the wheel.

10. In a tire carrier for disk wheels, the combination of a ring provided with a flange having an annular seat for the tire rim of the wheel, means for securing the ring to a vehicle, a cross bar fixed to the ring and clamping means supported on said cross-bar comprising bolts adapted to extend through the disk of the wheel.

11. In a tire carrier for disk wheels, the combination of a ring provided with a seat for the tire rim of the wheel, means for securing the ring to a vehicle, a cross-bar fixed to the ring, and a hub on said cross-bar adapted to extend through the hub opening in the wheel disk, and clamping-means supported by the cross-bar, to secure the wheel on the ring.

12. In a tire carrier for disk wheels, the combination of a ring provided with a flange having an annular seat for the tire rim of the wheel, means for securing the ring to a vehicle, a cross-bar fixed to the ring, a hub on said cross-bar adapted to extend through the hub opening in the wheel disk, and clamping-means supported by the cross-bar, to secure the wheel in the ring.

13. In a tire carrier for disk wheels, the combination of a ring provided with a seat for the tire rim of the wheel, means for securing the ring to a vehicle, a cross-bar fixed to the ring, clamping means on said cross-bar comprising bolts adapted to extend through the disk of the wheel, and a hub on the cross-bar to extend through the hub-opening in the wheel-disk.

14. In a tire carrier for disk wheels, the combination of a ring provided with a flange having an annular seat for the tire rim of the wheel, means for securing the ring to a vehicle, a cross-bar fixed to the ring, clamping means on said cross-bar comprising bolts adapted to extend through the disk of the wheel, and a hub on the cross-bar to extend through the hub-opening in the wheel-disk.

Signed at Detroit, Michigan, this 13th day of November, 1923.

CHARLES F. WASSERFALLEN.